UNITED STATES PATENT OFFICE.

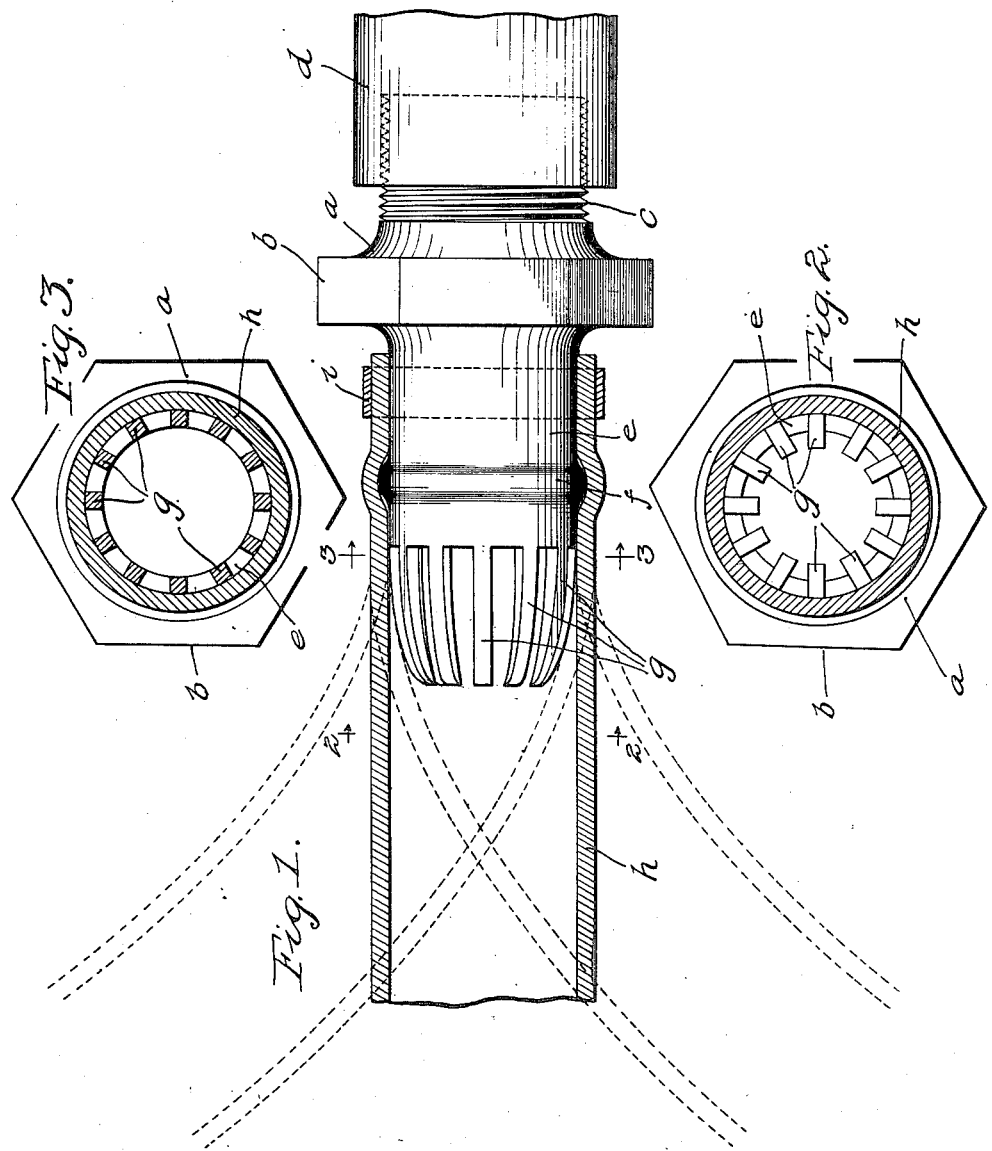

PHILIP BUEHNER, OF PORTLAND, OREGON.

NIPPLE.

1,106,542.  Specification of Letters Patent.  Patented Aug. 11, 1914.

Application filed November 23, 1912. Serial No. 733,087.

*To all whom it may concern:*

Be it known that I, PHILIP BUEHNER, a citizen of the United States, residing at Portland, in the county of Multnomah and State of Oregon, have invented a certain new and useful Improvement in Nipples, of which the following is a full, clear, concise, and exact description, reference being had to the accompanying drawings, forming a part of this specification.

My invention relates to fluid pipe lines and is particularly concerned with nipples which are employed to connect a rigid pipe, cock, elbow, or coupling with a flexible hose. My invention contemplates improved means for supporting, retaining, guiding and directing the flexible hose so as to reduce the tendency of the hose to tear or rupture caused by excessive wear. Furthermore, the form of the nipple of my invention facilitates the connecting of the hose thereto and these various advantages combine to produce a very useful article of manufacture.

Nipples as heretofore known comprised essentially a central nut portion with a screw-threaded portion on one side and a cylindrical portion with a bead on the other side, it being usual to stretch the flexible hose over the bead and to clamp the end of the hose in place in back of the bead. Such arrangements are employed where the flexibility of the hose is the reason for its employment and one of the most important uses is that of the air lines for the trucks on railroad trains. The hose are used to connect the lines of adjoining cars and, while they are substantially at rest while a train is running on straight track, it is obvious that they will be required to assume other positions and possibly nearly straighten out when the train takes a curve or when the cars are pulled apart. This continual working of the hose back and forth subjects is to considerable strain at the point where it is joined with the nipple and, not only are ruptures frequent, but under the present system the hose must be replaced frequently in order to keep the blowouts down to the present average. In order, therefore, to reduce the wear on the hose, I provide an extension on the hose receiving end of the nipple, which extension is shaped after the safe curvatures of the hose within proper limits and thus directs the hose in a curve so wide that the flexibility of the hose in bending will not meet with undue strain. The form of the extension is such that, although inwardly curved guiding surfaces are formed, the cross-sectional area of the passageway is not reduced. The extension may be made up of a plurality of prongs, or it may be solid except for properly formed and sized perforations, and in this way the guiding means forms no obstruction in the air line. The extension may be made solid if the operation of the air line will not be interfered with. It is difficult to describe the exact curvature which I find to be the best for the purpose, but it will be sufficient to say that it is substantially ellipsoidal, so that at no place is the hose liable to be stretched over an edge which will cause wear resulting in rupture. The form of the extension makes it possible to insert the nipple into the end of the hose, in primarily joining these parts, without doing damage to the inner lining of the hose such as has heretofore often been experienced.

My invention is illustrated in the accompanying drawing, in which—

Figure 1 is a side elevational view of the nipple of my invention showing it attached to an inherently rigid pipe adjoining a flexible hose connected thereto; Fig. 2 is a sectional view taken on the plane of the line 2—2 of Fig. 1; and Fig. 3 is a sectional view taken on the plane of the line 3—3 of Fig. 1.

The nipple is provided with a central body portion $a$ which has a polygonal periphery $b$ for the reception of a wrench. On one side of the body portion $a$ a screw-threaded portion $c$ is provided and this screw-threaded portion is adapted to screw into a pipe $d$ or any other receptacle. On the other side of the body $a$, a cylindrical portion $e$ of substantially uniform diameter is provided. These parts are all on the same axis, as illustrated. The cylindrical part $e$ is provided with a peripheral bead $f$. The cylindrical part $e$ is also provided with forwardly extending inwardly curved prongs $g$, $g$, whose outer surfaces are substantially ellipsoidal in form, as illustrated. The hose $h$ is slipped over the parts $g$ and $e$, and it will be clear how the form or shape of the part $g$ is effective in facilitating this wedging action. The end of the hose is carried substantially to the body part $a$, being thus carried over the bead $f$, and a clamping ring $i$ is provided to hold the hose securely in place.

Various positions of the flexible hose $h$ are illustrated by the dotted lines in Fig. 1 and these indications represent substantially the limits of movement of the hose. It will be seen that the surfaces of the tangs $g$ prevent kinking of the hose, certainly within these limits, and it is possible to swing the hose around still farther before it is folded over an edge or before it is subjected to the same effect. The reticulations in the extension are such that the capacity of the pipe is not reduced and all the advantages hereinbefore pointed out are obtained without interfering with the normal operation of the arrangement. The curve of the tangs or prongs coincides with the safe curvatures and inclinations of the hose and, with these curvatures or inclinations limited by the arrangement which I provide, as I have described, much if not all of the strain which would be likely to cause rupture is counteracted. The extension need not be integral with the body of the nipple but may be made separate and be attached thereto in some suitable manner.

I claim as new and desire to secure by Letters Patent:

1. A nipple having a central nut portion, a screw-threaded part on one side of said portion, a part of substantially uniform diameter on the other side of said portion, a bead on said second-named part, a plurality of rigid prongs extending from said second-named part, said prongs being formed to turn inwardly to follow the natural curvature of and to be engaged by the sides of a flexible hose on said second-named part, and a ring in back of said bead fastening said flexible hose on said second-named part, the combined areas of the spaces between the prongs being greater than the cross-sectional area of the bore of the uniform portion of the nipple.

2. As an article of manufacture, a nipple having a part of uniform diameter for the reception of a flexible hose, and a rigid longitudinally-slotted extension of ellipsoidal form extending into the hose, the combined areas of the slots being greater than the cross-sectional area of the bore of the uniform part of the nipple.

3. As an article of manufacture, a nipple having a part of uniform diameter for the reception of a flexible hose, and a rigid extension of ellipsoidal form extending into the hose, the wall of said extension having a plurality of openings therethrough the combined areas of the openings being greater than the cross-sectional area of the bore of the uniform part of the nipple.

4. As an article of manufacture, a nipple having a part of uniform diameter for the reception of a flexible hose, and a rigid longitudinally-slotted extension tapering from said part of uniform diameter in ellipsoidal form and extending into the hose, the combined areas of these slots being greater than the cross-sectional area of the bore of the uniform part of the nipple.

In witness whereof, I hereunto subscribe my name this 18th day of November, A. D. 1912.

PHILIP BUEHNER.

Witnesses:
LESLIE W. FRICKE,
ALBERT G. McCALEB.